United States Patent Office

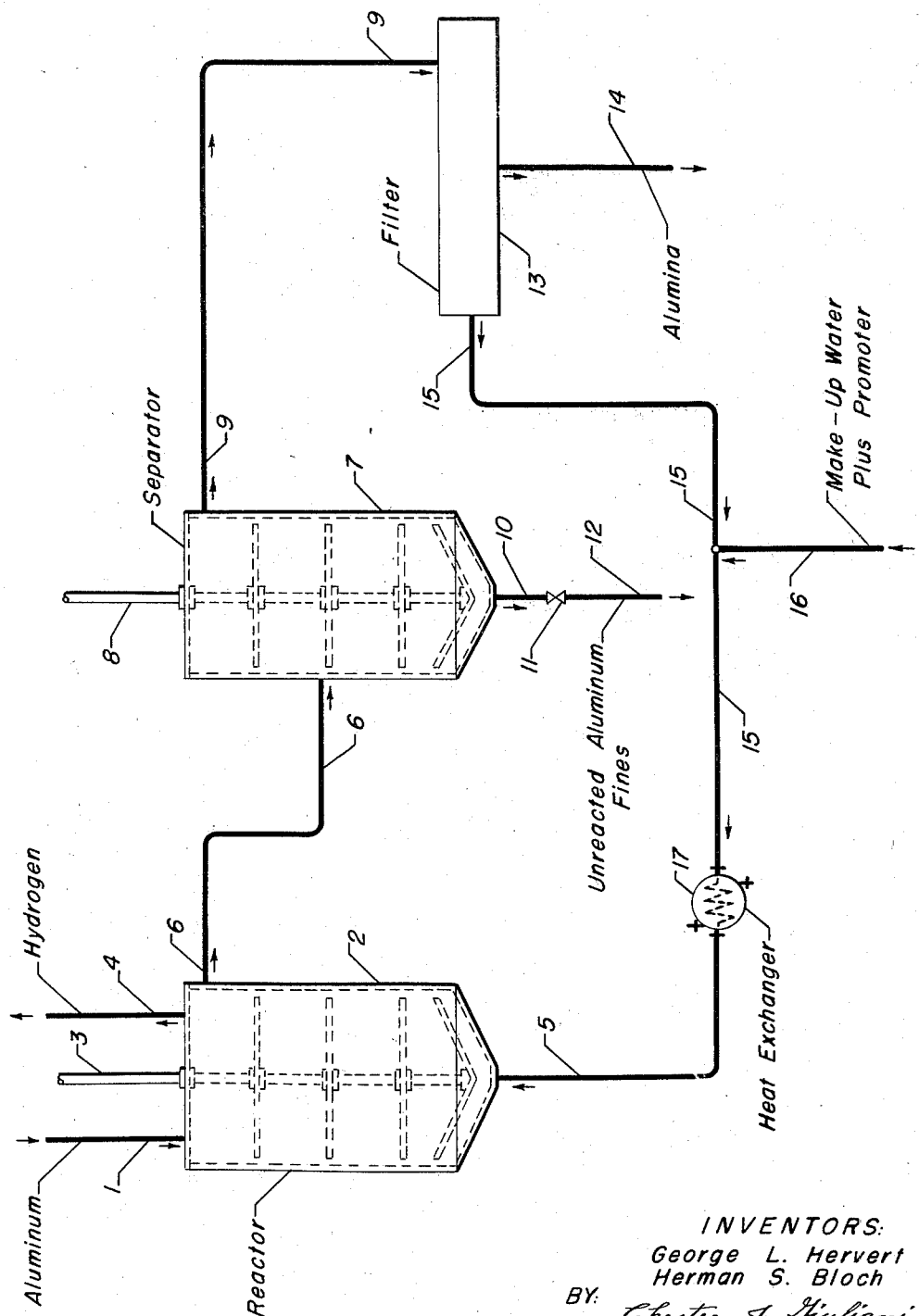

2,958,581
Patented Nov. 1, 1960

2,958,581

PRODUCTION OF ALUMINA

George L. Hervert, Downers Grove, and Herman S. Bloch, Skokie, Ill., assignors, by mesne assignments, to Universal Oil Products Company, Des Plaines, Ill., a corporation of Delaware Filed Oct. 1, 1958, Ser. No. 764,668

10 Claims. (Cl. 23—143)

This application is a continuation-in-part of our co-pending application Serial No. 520,802, filed July 8, 1955, now Patent No. 2,855,275, which is a continuation-in-part of our co-pending application Serial No. 315,414, filed October 17, 1952 now abandoned.

This invention relates to the preparation of alumina and more specifically to a method of preparing alumina by the interaction of water and metallic aluminum in the presence of organic catalysts.

Alumina, either as the hydrate or the anhydrous form as aluminum oxide is widely used in the petroleum and many other branches of chemical industry. It has been employed in the petroleum industry as a catalyst for hydrocarbon conversion processes, as a support for catalytically active materials to be used in hydrocarbon conversion processes, and as a dehydrating agent. It is widely used in other fields of chemical industry for the same purposes. The activated forms which are considered to be merely modifications of aluminum oxide and its hydrates are especially known for their pronounced catalytic activity and adsorptive capacity. The use of alumina as a refractory is also well known. Alumina in the form of corundum has been found suitable for use in the manufacture of certain types of refractory and ceramic materials. High purity alumina is also used medicinally. In other uses alumina is mixed or blended with other components to produce substances of modified properties.

In one modification of the invention the alumina produced under the conditions of our invention is in an extremely fine state of division and requires no grinding to render it impalpable, nevertheless it is relatively easily filterable and may thus be readily separated from the liquid in which it is formed so that the latter may be reused. The alumina in an extremely finely divided form, that is, an impalpable powder, is especially suitable for cosmetics, medicinals, fine abrasives, or agricultural or military dusting purposes.

It is an object of our invention to provide a new process for the production of alumina and further to produce high purity alumina.

It is another object of our invention to provide a new process for the production of extremely finely divided alumina and further to produce this alumina in a very pure state.

Alumina or aluminum hydrate is present in various modifications, the more common types of alumina being the following:

Alpha-alumina, often known as corundum, is the form stable at temperatures over about 1800° F.

Gamma-alumina is very stable but changes to alpha-alumina at temperatures above about 1800° F.

Epsilon-alumina is the alumina formed in thin films on the surface of metallic aluminum during oxidation by dry or wet air or oxygen.

Gamma-$Al_2O_3 \cdot 3H_2O$ or gibbsite is prepared by aging Boehmite in a cold basic solution.

Alpha-$Al_2O_3 \cdot 3H_2O$ or bayerite is also formed by aging Boehmite in a cold basic solution but is unstable and gradually is transformed into gibbsite.

Gamma-$Al_2O_3 \cdot H_2O$ or Boehmite may be prepared in a variety of ways, one of the simplest being to add ammonium hydroxide to a water solution of aluminum chloride. The material originally precipitated is thought to be an amorphous alumina flock which rapidly grows in crystal size yielding crystalline Boehmite. Aging the Boehmite in ammonium hydroxide solution transforms the Boehmite first to meta-stable bayerite and finally to the stable gibbsite.

Alpha-$Al_2O_3 \cdot H_2O$ or diaspore occurs abundantly in nature.

In the specification and claims the word alumina will mean one or more of these various modifications, either as anhydrous alumina or alumina hydrate or aluminum hydroxide unless otherwise specifically noted.

By varying the conditions of the process of this invention it will be shown that some of the various modifications of alumina as hereinbefore described may be obtained.

The usual commercial method of producing alumina is by purifying ores in which the oxide is present. Another method is by the precipitation of aluminum hydroxide from its salts, for example, by the addition of ammonia to an aqueous solution of aluminum sulfate. However, the physical form of the product produced in our process is much superior since it is crystalline and easily filterable, while the precipitated aluminum hydroxide is a gel that is filtered with difficulty.

We have now discovered and our invention broadly comprises an improved method for preparing alumina by reacting aluminum with water under specific conditions and in the presence of certain water soluble organic catalytic substances. Hydrogen in a very pure state is produced as a by-product of this reaction.

It is recognized that the art teaches that alumina is formed on the surface of aluminum upon exposure to dry or wet air or oxygen; however, it is always referred to as a protective coating of alumina which prevents the aluminum metal under this coating from being converted to the oxide. Our invention, however, is such that a substantial amount, and in the more desirable aspect, the entire amount of aluminum is converted to the oxide and is separated as such, that is substantially free from aluminum metal. In the prior art the protective coating is taught to be of a tenacious nature, in that it adheres rigidly to the aluminum metal, while in our invention alumina is formed in a state that is easily separated from the reactants. In the preferred embodiments of our invention all of the aluminum is converted to the hydrated oxide and it is only necessary to separate water and catalyst therefrom which may be done by appropriate filtering or heating steps. In other modes of operation where all of the aluminum is not converted to the oxide, the two solids occur substantially as distinct separate solids which do not adhere and are not attached to each other to any appreciable extent and may thus be separated by any satisfactory means, such as centrifugal separation, flotation, and the like. It is not neessary and, in fact, it is undesirable that the separation be effected by some cutting means, such as scraping or tumbling to remove the oxide from the surface of the metal since under the condition of operation of our invention alumina is present, distinct and separate from the aluminum metal from which it is formed.

The aluminum to be used in our process can be any commercially available aluminum although if a high purity alumina product is desired it is preferable to start with high purity aluminum. It is also within the scope of this invention to use aluminum alloys, however, since the present process will produce a very pure alumina, it is a preferred embodiment of the present invention to react aluminum of 99.5+% purity in water to produce a high purity alumina product.

The degree of subdivision of the aluminum is another factor determining the rate of the reaction. The smaller the size of the particles the greater the surface area of aluminum exposed to the water for reaction. Powdered aluminum may be used, or aluminum turnings, or granulated aluminum. Aluminum pellets prepared by dropping molten aluminum into water have likewise proven to be very satisfactory for producing alumina by the process of our invention, those pellets below about an inch in average diameter being preferred.

One embodiment of the present invention comprises agitating the aluminum and water and catalytic substances sufficiently so that the reaction to produce alumina proceeds at a desirable rate. The reaction velocity is dependent upon the temperature of the reactants, the degree of subdivision of the aluminum, and the degree of agitation given the mixture. Thus a reaction that proceeds slowly at a temperature of 212° F. with only a mild agitation or shaking of the mixture will proceed very rapidly if the mixture is vigorously agitated. At a temperature of 572° F., on the other hand, the reaction proceeds relatively rapidly even with a mild degree of agitation. However, if the mixture is subjected to vigorous agitation, the time necessary for complete reaction is substantially decreased.

A preferred embodiment of the present invention relates to the process for producing hydrated alumina which comprises reacting aluminum with water in the presence of certain water soluble organic catalytic substances, agitating the mixture to form alumina, maintaining a pressure sufficient to keep at least a portion of the water in the liquid phase and separately recovering alumina therefrom.

It is a desirable feature of the present invention that liquid water be present and it is thus necessary when temperatures above the boiling point are employed to effect the reaction under sufficient pressure to maintain a liquid phase of water. The critical temperature of water is 705.2° F.; the definition of the critical temperature being that temperature above which a gas cannot be liquefied by pressure alone. It is desirable to use liquid water since it is much easier to have intimate contact and especially mixing between the aluminum and water accomplished if there is a liquid phase. However, the reaction will also proceed if the water is present in the vapor phase, especially at superatmospheric pressures, and while it is a desired feature to keep water in the liquid phase, it is not at all a limiting feature. Experiments conducted at temperatures near the critical temperature at pressures sufficient to maintain water in the liquid phase have been entirely successful and the reaction proceeds at a very rapid rate. Also, experiments conducted at temperatures near the critical temperature and at pressures insufficient to maintain water in the liquid phase have been entirely successful. From a practical standpoint, the upper temperature can be limited to about 850° F. since temperatures above this cause excessive decomposition of most of the effective organic nitrogen-base activators.

In another embodiment the present invention relates to a process for producing hydrated alumina which comprises reacting aluminum with water in the presence of a non-metallic organic base to form alumina and separately recovering alumina therefrom.

In a specific embodiment the present invention relates to a process for producing alumina which comprises reacting aluminum with water in the presence of a water soluble organic nitrogen base to form alumina and separating the resultant alumina from the reaction mixture.

In another specific embodiment the present invention relates to a process for producing alumina which comprises reacting aluminum with water in the presence of ethanolamine to form alumina and separately recovering alumina therefrom.

In a further embodiment the present invention relates to a process for producing alumina which comprises reacting metallic aluminum at a temperature of from about 30° F. to about 705° F. with liquid water having a water soluble organic nitrogen-containing base dissolved therein.

The water soluble organic nitrogen base used in this reaction acts as an accelerant to speed the reaction of aluminum with water in order to form the desired alumina. We have discovered, and our invention is based on the discovery, that water soluble organic nitrogen bases are catalysts for the reaction between aluminum and water to form alumina. It is the catalytic properties not merely the physical or chemical properties, of the organic bases which causes them to be catalysts for this reaction. The exact reason why the water soluble organic nitrogen bases are catalysts for this specific reason is not known, and the discovery was unexpected. Where the base used in this process is of such a nature that it reacts or promotes reaction with walls of an ordinary reaction vessel it is preferred, of course, that the reaction vessel be constructed of material inert to the reactants in order that corrosion and contamination of the products may be avoided.

A preferred step of the present invention is the reaction of aluminum with water in the presence of a water soluble nitrogen-containing organic base, such as ethanolamine. When a water soluble nitrogen-containing organic base is used as a catalyst in this reaction, the reaction will proceed at a much lower temperature than if these bases are absent. For example, if 18 grams of aluminum and 200 grams of distilled water are placed in a pressure autoclave and the reaction mixture is heated to 200° F., only a very small amount of reaction is noticeable within 24 hours; however, if a catalytic amount of monoethanolamine is introduced the reaction will have been substantially completed in 6 hours.

Further, in the presence of the water soluble nitrogen-containing organic bases, aluminum alloys which are inert to the action of water alone even at high temperatures (such as 2S aluminum containing 1% Fe, 0.2% Mn, 0.1% Cu, 0.2% Si, 0.05% Ga, 0.03% Mg, and 0.008% Ti) react readily at relatively mild temperatures.

Since the water soluble organic base acts as an accelerant or catalyst it is preferably used in very low concentrations. The water soluble organic nitrogen base need not be completely soluble in water but it need only be soluble to the extent that it is needed as a catalyst. For example if only 2% by weight of a specific organic nitrogen-containing base is necessary to catalyze the reaction, it is only necessary for the base to be water soluble to the extent of 2%. The base, however, must be water soluble at the reaction temperature. We have found that there is a range of concentrations in which the base exhibits maximum activity. For example, we have found that concentrations of monoethanolamine used as a catalyst within the range of from about 4% to about 20% have the highest catalytic effect and concentrations lesser or greater than these do not have as great a catalytic effect. Similarly, with n-butylamine maximum reaction velocity leading to substantially complete conversion of the aluminum in a minimum time, occurs with amine concentrations of about 4% to about 23%. Any amount of a base, used as an accelerant or catalyst herein mentioned will be a catalytic amount or referred to as a catalytic amount. The concentration of the catalyst in the water-catalyst solution will usually be within the range of from about 0.05% to about 50% by weight.

The catalyst may consist of water soluble nitrogen-containing organic bases such as:

(1) Primary, secondary, and tertiary alkylamines, as for example, ethylamine, diethylamine and triethylamine, butylamine.

(2) The alkanolamines, for example the ethanolamines, such as monoethanolamine, diethanolamine and triethanolamine.

(3) Aryl-alkyl amines (primary, secondary and tertiary) such as benzylamine, methylaniline and dimethylaniline.

(4) Pyridine and its homologs, such as the picolines, lutidines and collidines.

(5) Piperidine and its homologs.

In general, we have found that the organic nitrogenous bases fall roughly into three classes: those having, in aqueous solution, ionization constants equal to or greater than $10^{-5}$ and exhibiting pH values (for 2–25% solutions) above about 12, which are highly active catalysts for dissolving aluminum; those having ionization constants equal to or below about $10^{-9}$ and exhibiting pH values of less than about 11, which are poor catalysts; and those exhibiting intermediate pH values (11 to 12) and having intermediate ionization constants ($10^{-6}$ to $10^{-8}$), which are fair catalysts.

It is our belief, although we do not intend the scope of this invention to be limited by this theory, that the nitrogen bases catalyze the reaction of aluminum with water by continuously dissolving the protective aluminum oxide film thereby exposing fresh aluminum surface for reaction. It is possible, for example, that the oxide film is removed by the formation of aluminum-nitrogen base complexes which are sufficiently soluble to be carried into the aqueous phase wherein alumina is precipitated from the complex and the nitrogen base regenerated for further use.

As hereinbefore stated the organic nitrogen-containing base must be water soluble, but need only be water soluble to the extent that it is needed as a catalyst at the reaction conditions. It may, therefore, be considered that the aluminum is reacted with water having an organic nitrogen-containing base dissolved therein or it may be stated that the aluminum is reacted with an aqueous solution of an organic nitrogen base. The word solution is intentionally used so as to indicate that the organic base is soluble in the water to the extent required.

Several of the advantages of our process have hereinbefore been mentioned. The process also has the advantage of introducing only volatile materials into the reaction mixture and these may easily be removed from the product alumina by heating or oxidation. The organic nitrogen-containing bases also have the advantage of having a wide variety of boiling points. Therefore, when it is desired to conduct the alumina-water reaction at a high temperature an organic nitrogen-containing base with a high boiling point may be used. This is a definite advantage over other processes in which a volatile catalyst is used, since in our process a high concentration of the organic nitrogen base may more easily be maintained in the liquid phase.

Much has already been made of the fact that it is preferable to use a liquid phase of water and, therefore, the preferred upper limit of temperature that the reaction may proceed at is the critical temperature of water of about 705° F. The reaction requires increasingly longer periods of time as the temperature of the reaction is decreased and where the time of the reaction is not important it is possible to effect the reaction at temperatures down to the freezing point of the water and catalyst solution, that is, about 32° F. or lower, although the reaction is quite slow at such low temperatures. Thus the temperature range in which the reaction between aluminum and water in the presence of a catalyst is effected is from about 32° F. to about 850° F.

Within the range of temperatures in which the reaction may be effected the alumina is produced in various modifications. In the lower range of temperatures, for example, from about 32° F. to about 160° F. the alumina is produced in an extremely finely divided form that is, the alumina is produced in this form directly without the need of attrition or grinding. To obtain this finely divided alumina, or impalpable powder directly, the reaction is effected at relatively low temperatures which necessitate relatively long reaction periods. The preferred upper temperature limit is about 160° F., however, temperatures above this may be used with the understanding that if the reaction is effected at temperatures above about 160° F. alumina particles will be formed in an increasingly larger average crystalline size. The reaction requires increasingly longer periods of time as the temperature of the reaction is decreased and where the time of the reaction is not important it is possible to effect the reaction at temperatures down to the freezing point of water and catalyst solution, that is, about 30° F. Thus the preferred range of temperatures in which the reaction between aluminum and water in the presence of a catalyst is effected to produce the most finely divided form of alumina is from about 30° F. to about 160° F. The alumina produced in this reaction is further characterized as being gibbsite. An analysis of the alumina product formed at 400° F. shows that the product is chiefly gibbsite, however, traces of Boehmite, a modification of alumina, are evidenced. As the temperature of the reaction is increased in excess of 400° F. the percent of Boehmite in the product is accordingly increased, and at a temperature of approximately 650° F. the product of the reaction between aluminum and water in the presence of a catalyst is analyzed as being Boehmite. The temperature at which the reaction is carried out also affects the size of the alumina crystals. The reaction between aluminum and water at high temperatures will produce larger crystals which after drying appear to be rough enough to use as an abrasive. The amount of organic nitrogen base activator present also affects the crystallite size, larger average particle sizes being obtained with lower concentrations of activator. Further, particle size distribution data on $Al_2O_3$ produced from the monoethanolamine catalyzed reaction at 212° F. indicate that smaller particles of alumina are produced at higher amine concentrations.

The reaction may be effected in any suitable type of equipment wherein the reactants are subjected to agitation and preferably to vigorous stirring. The operation may be carried out in continuous or batch-wise fashion. When temperatures above the boiling point of water are employed and the reaction is performed with water in the liquid phase it is, of course, necessary that the reaction vessel be capable of withstanding pressures sufficient to maintain a liquid phase of water. In small scale production of alumina by this process a rotating pressure autoclave is satisfactory. When the temperatures employed are below the boiling point of water the reaction may be effected in ordinary open equipment, in which a means is provided for the safe escape of hydrogen and for vigorous stirring or agitation of the reagents. It is, however, necessary that the process equipment be constructed of such materials that they are not affected by water or aluminum and/or the catalysts used so that undesirable elements are not introduced into the desired alumina product. However, if the presence of these foreign substances is not objectionable the above precautions need not be adhered to. Hydrogen is produced as a by-product of the reaction and a means of venting must be provided if the pressure build-up caused by the production of this hydrogen is to be avoided. If the equipment will withstand this additional pressure, however, it is not necessary to vent the hydrogen continuously.

The figure of the accompanying diagrammatic flow drawing illustrates a particular method for continuously conducting the process which incorporates several specific embodiments of the invention. For simplification, equipment such as valves, pumps, and similar appurtenances have been omitted in the drawing. These are well known and are not essential to the understanding of the invention.

Referring to the drawing, aluminum in the form of chips or pellets is passed through line 1 into reactor 2 which is provided with a stirring or agitating device 3 and a means of venting hydrogen 4. Water at approximately 212° F. plus a promotor are introduced into reactor 2 through line 5. The reaction between aluminum and water is allowed to proceed in reactor 2 until the aluminum is essentially entirely converted to alumina and the alumina, traces of aluminum fines and water form a slurry in the reactor which is withdrawn through line 6. The slurry in line 6 is passed into separator 7 which is provided with a stirring device 8 which provides sufficient agitation to aid in suspending the alumina but allows the unreacted aluminum fines to settle from the slurry to the bottom of the separator. The aluminum fines are periodically withdrawn through line 10 and are passed through valve 11 and line 12 to be reclaimed and may be again introduced into reactor 2. The alumina slurry in separator 7 is withdrawn through line 9 and the slurry is introduced into filter 13. Filter 13 may be any suitable filtering means such as a continuous rotary filter or it may be any usual commercial batch filter that may be found suitable for this process. The alumina is withdrawn from the filter through line 14 and may be subjected to further treatment such as washing to remove traces of the promoter or the alumina may be directly dried and calcined for any of the various uses hereinbefore mentioned. The water and promoter from filter 13 are removed through line 15 and are joined by a make-up water plus promoter stream in line 16 after which the combined stream is passed through heat exchanger 17 and into line 5. In heat exchanger 17 the water plus promoter are raised to the desired reaction temperature. If it is preferred to effect the reaction at temperatures above the normal boiling point of water it is necessary that reactor 2 be constructed so as to withstand process pressures at least sufficient to maintain a liquid phase. In these modes of high temperature and pressure operation it may be desirable to substitute a direct heater for heat exchanger 17.

The precipitated alumina formed in our reaction need merely be filtered from the water-organic nitrogen base mixture and water washed to be ready for use; in many cases, especially where a subsequent calcination is involved in the use of the alumina, even the water washing is unnecessary since no foreign non-volatile materials are introduced during the preparation of the alumina; the absence of foreign metals in the product alumina is, in fact, a feature of this method of preparation. The organic nitrogen base is not consumed in the reaction and the filtrate from the alumina may, therefore, be reused for further reaction with aluminum.

The following examples are given to illustrate our invention but are not given for the purpose of unduly limiting the generally broad scope of said invention.

Example I 18 grams of aluminum pellets (99.9+% purity) of about ⅜" to ⅝" diameter, and 200 grams of distilled water were placed in an Ipatieff-type autoclave having a capacity of 850 milliliters; the autoclave was fitted internally with a Pyrex liner. After sealing, the autoclave was flushed with nitrogen and subsequently heated to a temperature of 392° F. The temperature was maintained at this level for a period of 24 hours, after which time an inspection indicated that only a very minor amount of the metallic aluminum had reacted with the water, forming thereby alumina. The alumina product was dried at 230° F. for 1 hour, and an analysis thereof indicated that the product was gibbsite. These results indicated that, at an elevated temperature of 392° F. and conditions as outlined above, the reaction between aluminum and water, in the absence of any catalytic material, is extremely slow and would not be an attractive commercial method for producing alumina.

Example II 200 grams of distilled water and 18 grams of aluminum chips (99.9+% purity), approximately ⅟₁₆" wide, ¼" long and ⅟₁₆" thick, were placed in a two-liter Pyrex flask equipped with a six-blade, high-speed Pyrex stirrer. The alumina and the water were maintained at room temperature (approximately 80° F.) for a period of 15 days. At the termination of this period, only a very small amount of alumina was evident within the Pyrex flask; the greater bulk of the aluminum remained unchanged.

Example III

In this and the following examples, a two-liter Pyrex flask, equipped with two water condensers and a six-blade Pyrex stirrer, was employed as the reaction vessel. The speed of the stirrer was maintained at 1500 r.p.m. by means of a Variac, and this speed was utilized in all the examples. 18 grams of aluminum chips (99.9+% purity) and 0.837 mol of tri-ethylamine were placed in the reaction vessel. To this mixture was added a sufficient quantity of distilled water (415 grams) to yield a total of 500 grams of material within the flask. The temperature was maintained at 99.5% C. for six hours. After cooling, the alumina was separated from the other contents within the reaction vessel, via decantation; the alumina was washed with distilled water and thereafter dried at 110° C. for 3 hours. The quantity of metallic aluminum, which had reacted with the water, was calculated on the basis of that quantity of aluminum recovered from the mixture remaining in the reaction vessel. In the instant example, 85.6% by weight of the metallic aluminum had reacted with the water.

Example IV 18 grams of aluminum chips and 0.837 mol of mono-butylamine were placed within the reaction flask. To this mixture was added 439 grams of distilled water to yield a total of 500 grams of material within the flask. The temperature of the flask was maintained at 87° C. for a period of 6 hours. As hereinabove set forth, the resulting alumina was removed from the flask by decantation, and thereafter washed with distilled water and dried at 110° C. for 3 hours. In this particular example, there was no unreacted aluminum, indicating that the utilization of mono-butylamine resulted in 100% reaction of the aluminum with the water.

Example V

Di-ethylamine, in an amount of 0.837 mol, was added to an aluminum-water mixture, and maintained at a temperature of 76° C. for a period of 6 hours. Based upon the unreacted metallic aluminum remaining within the reacting vessel, following the 6-hour period, a 99.3% reaction forming alumina was indicated. At a temperature of 95° C., the use of 0.837 mol of di-butylamine resulted in 35.0% reaction between the metallic aluminum and the water. As hereinbefore set forth, the utilization of aryl-alkylamines such as benzylamine, methylaniline and dimethylaniline results in at least a partial reaction between the metallic aluminum and the water, which reaction is not effected in the absence of such catalytic material.

The foregoing examples clearly indicate that we have provided a new method for the production of alumina, and illustrate the benefits afforded through the utilization thereof. Insignificant modifications, readily apparent to one skilled in the art of manufacturing alumina, are intended to be within the scope and spirit of our invention; the invention is not intended to be restricted beyond the spirit of the appended claims.

We claim as our invention:

1. A process for producing hydrated alumina which comprises reacting metallic aluminum, at a temperature of from about 30° F. to about 705° F., with liquid water having dissolved therein a catalytic amount of an amine selected from the group consisting of primary alkylamines, secondary alkylamines, tertiary alkylamines, primary aryl-alkylamines, secondary aryl-alkylamines and tertiary aryl-alkylamines, for a time sufficient to react a substantial portion, at least, of the aluminum with the water, and separating the resulting alumina from the reaction mixture.

2. The process of claim 1 further characterized in that said amine comprises tri-ethylamine.

3. The process of claim 1 further characterized in that said amine comprises mono-butylamine.

4. The process of claim 1 further characterized in that said amine comprises di-ethylamine.

5. The process of claim 1 further characterized in that said amine comprises benzylamine.

6. The process of claim 1 further characterized in that said amine comprises methylaniline.

7. The process of claim 1 further characterized in that said amine comprises di-methylaniline.

8. The process of claim 1 further characterized in that said temperature is within the range of from about 30° F. to about 160° F. whereby the alumina is produced in finely divided form.

9. The process of claim 1 further characterized in that said temperature is within the range of from about 30° F. to about 400° F. whereby the alumina is produced in the form of gibbsite.

10. The process of claim 1 further characterized in that said temperature is in excess of 400° F. whereby the alumina is produced in the form of Boehmite.

References Cited in the file of this patent

UNITED STATES PATENTS

| | | |
|---|---|---|
| 2,855,275 | Hervert et al. | Oct. 7, 1958 |
| 2,872,418 | Hervert et al. | Feb. 3, 1959 |

OTHER REFERENCES

Mellor: "Comprehensive Treatise on Inorganic and Theoretical Chemistry," volume 5, page 212 (1924), Longmans, Green and Co., New York, N.Y.

Thorpe: "Dictionary of Applied Chemistry," 4th edition, vol. 1, page 274 (1937), Longmans, Green and Co., New York, N.Y.